United States Patent
Chandra et al.

(10) Patent No.: US 9,990,183 B2
(45) Date of Patent: Jun. 5, 2018

(54) SYSTEM AND METHOD FOR VALIDATING SOFTWARE DEVELOPMENT REQUIREMENTS

(71) Applicant: Wipro Limited, Bangalore (IN)

(72) Inventors: Aman Chandra, Bangalore (IN); Varun Anant, Bangalore (IN)

(73) Assignee: Wipro Limited, Bangalore (IN)

( * ) Notice: Subject to any disclaimer, the term of this patent is extended or adjusted under 35 U.S.C. 154(b) by 359 days.

(21) Appl. No.: 15/046,170

(22) Filed: Feb. 17, 2016

(65) Prior Publication Data
US 2017/0185381 A1    Jun. 29, 2017

(30) Foreign Application Priority Data
Dec. 28, 2015  (IN) ............................ 7002/CHE/2015

(51) Int. Cl.
*G06F 9/44*    (2018.01)
(52) U.S. Cl.
CPC ..................................... *G06F 8/10* (2013.01)
(58) Field of Classification Search
None
See application file for complete search history.

(56) References Cited

U.S. PATENT DOCUMENTS

2008/0263505 A1*  10/2008  StClair ................... G06F 8/10
                                                              717/101

OTHER PUBLICATIONS

Huertas et al., "Towards Assessing the Quality of Functional Requirements Using English/Spanish Controlled Languages and Context Free Grammar", 2013, pp. 234-241, SDIWC.

* cited by examiner

*Primary Examiner* — Qamrun Nahar
(74) *Attorney, Agent, or Firm* — LeClairRyan PLLC

(57) ABSTRACT

System and method for validating software development requirements are disclosed. The method comprises accessing a software development requirement, extracting a plurality of tokens from the software development requirement, tagging each of the plurality of tokens to a corresponding part of speech, and deriving a pattern based on the plurality of tokens and the plurality of corresponding parts of speech. The method further comprises determining at least one of a context and a business domain of the software development requirement and identifying pre-defined rules for the plurality of tokens and pre-defined patterns for the pattern. In response to a positive identification, the software development requirement are validated by analyzing the plurality of tokens against the pre-defined rules and by analyzing the pattern against the pre-defined patterns. In response to a negative identification, a learning process is initiated based on intelligence gathered from a manual validation of the software development requirement.

21 Claims, 4 Drawing Sheets

SYSTEM AND METHOD FOR VALIDATING SOFTWARE DEVELOPMENT REQUIREMENTS

This application claims the benefit of Indian Patent Application Serial No. 7002/CHE/2015 filed Dec. 28, 2015, which is hereby incorporated by reference in its entirety.

FIELD

This disclosure relates generally to software development, and more particularly to a system and method for validating software development requirements.

BACKGROUND

The requirements phase is the most critical phase of the software development life cycle (SDLC). The quality of the requirements gathered during requirement phase affects the overall quality of the subsequent phases and hence, the software product. In the current business environment, about 50% of the software production or post release defects could be traced back to incorrect requirements. Fixing up these defects takes a significant amount of time and money and leads to cost and schedule overruns. A cost analysis shows that the cost associated with fixing the defects increases significantly with the defect discovery stage in the SDLC. Thus, when a defect is leaked into production, the cost of fixing that defect and testing the solution is the costliest. For example, if a defect that could have been detected in testing phase or in development phase is detected post release, then it would cost about 20-400 times more to fix than if the defect had been detected in the development phase or the testing phase itself. Further, only about 34% of projects are delivered on time and budget, and poor requirement quality is one of the major contributors to this problem.

Despite the availability of vast literature and best practices on requirements gathering, requirements still fail to meet quality benchmarks due to a variety of reasons ranging from miscommunication, stakeholder availability, manual validation processes, and so forth. Poorly captured requirements are prone to a number of quality problems or violation types such as ambiguity, atomicity, incompleteness, duplicity, non-specificity, un-verifiability, contradictory, and so forth. These quality violations in the captured requirements may lead to subsequent requirement volatility which leads to rework, cost overruns and schedule deviation, thereby significantly impacting business and project outcomes. For example, poorly captured requirements may be used as a reference for the software development leading to poor design, poor code, and on many occasions incorrect features and defects.

Additionally, projects also fail to differentiate between functional and non-functional requirements and treat them the same way for use case modeling which further impacts the output quality. Poorly documented functional requirements are far more critical as they form the core of the system and should be corrected as early as possible. Further, in Agile software development methodologies involving quick sprints, multiple iterations, and unclear goals, the manual methods of requirements validation is limiting because of being a time consuming process resulting in a negative impact on the overall sprint velocity. It is evident that identifying defects at the earlier stages of SDLC has significant effort and cost savings. However, due to the constraints related to requirements validation, the defects usually pass on to the testing phase and in some cases the unidentified defects creep into the further stages and are also found after deployment. Such defects are not only costly to fix but also difficult to fix due to the complex systems and the impact on business.

In short, requirements gathering and validation is a key phase but such quality violations continue to percolate frequently because of time and technology constraints. While such violations adversely impact the development unit in terms of cost and schedule, it also has a tremendous impact on the business in terms of time to market, reputation, and the bottom-line.

SUMMARY

In one embodiment, a method for validating software development requirements is disclosed. In one example, the method comprises accessing a software development requirement. The method further comprises extracting a plurality of tokens from the software development requirement. The method further comprises tagging each of the plurality of tokens to a corresponding part of speech. The method further comprises deriving a pattern based on the plurality of tokens and the plurality of corresponding parts of speech. The method further comprises determining at least one of a context and a business domain of the software development requirement. The method further comprises identifying pre-defined rules for the plurality of tokens and pre-defined patterns for the pattern from an intelligence repository based on at least one of the context and the business domain. In response to a positive identification, the method further comprises validating the software requirement by analyzing the plurality of tokens against the pre-defined rules and by analyzing the pattern against the pre-defined patterns. In response to a negative identification, the method further comprises initiating a learning process based on intelligence gathered from a manual validation of the software requirement.

In one embodiment, a system for validating software development requirements is disclosed. In one example, the system comprises at least one processor and a memory communicatively coupled to the at least one processor. The memory stores processor-executable instructions, which, on execution, cause the processor to access a software development requirement. The processor-executable instructions, on execution, further cause the processor to extract a plurality of tokens from the software development requirement. The processor-executable instructions, on execution, further cause the processor to tag each of the plurality of tokens to a corresponding part of speech. The processor-executable instructions, on execution, further cause the processor to derive a pattern based on the plurality of tokens and the plurality of corresponding parts of speech. The processor-executable instructions, on execution, further cause the processor to determine at least one of a context and a business domain of the software development requirement. The processor-executable instructions, on execution, further cause the processor to identify pre-defined rules for the plurality of tokens and pre-defined patterns for the pattern from an intelligence repository based on at least one of the context and the business domain. In response to a positive identification, the processor-executable instructions, on execution, further cause the processor to validate the software requirement by analyzing the plurality of tokens against the pre-defined rules and by analyzing the pattern against the pre-defined patterns. In response to a negative identification, the processor-executable instructions, on execution, further cause the processor to initiate a learning process based on intelligence gathered from a manual validation of the software requirement.

In one embodiment, a non-transitory computer-readable medium storing computer-executable instructions for validating software development requirements is disclosed. In one example, the stored instructions, when executed by a processor, cause the processor to access a software development requirement. The stored instructions, when executed by a processor, further cause the processor to extract a plurality of tokens from the software development requirement. The stored instructions, when executed by a processor, further cause the processor to tag each of the plurality of tokens to a corresponding part of speech. The stored instructions, when executed by a processor, further cause the processor to derive a pattern based on the plurality of tokens and the plurality of corresponding parts of speech. The stored instructions, when executed by a processor, further cause the processor to determine at least one of a context and a business domain of the software development requirement. The stored instructions, when executed by a processor, further cause the processor to identify pre-defined rules for the plurality of tokens and pre-defined patterns for the pattern from an intelligence repository based on at least one of the context and the business domain. In response to a positive identification, the stored instructions, when executed by a processor, further cause the processor to validate the software requirement by analyzing the plurality of tokens against the pre-defined rules and by analyzing the pattern against the pre-defined patterns. In response to a negative identification, the stored instructions, when executed by a processor, further cause the processor to initiate a learning process based on intelligence gathered from a manual validation of the software requirement.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
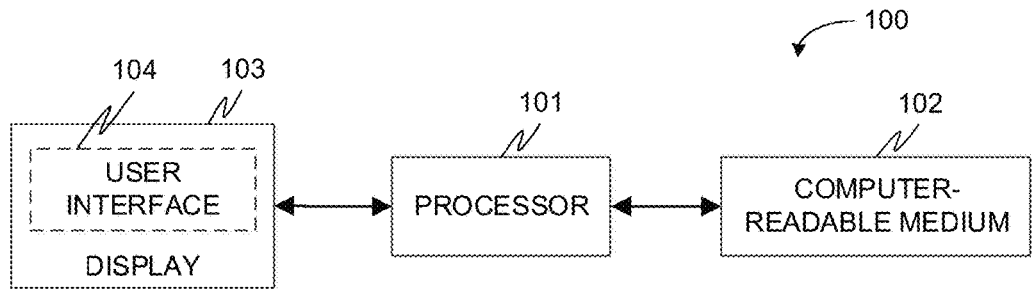
FIG. 1 is a block diagram of an exemplary system for validating software development requirements in accordance with some embodiments of the present disclosure.

Referring now to FIG. 1, an exemplary system or validation computing device 100 for validating software development requirements is illustrated in accordance with some embodiments of the present disclosure. In particular, the system 100 implements a software development requirement validation engine for validating software development requirements. As will be described in greater detail in conjunction with FIG. 2, the requirement validation engine performs validation of software requirements using one or more of pre-defined rules, pre-defined patterns, classifications, contexts, and business domains. The system 100 comprises one or more processors 101, a computer-readable medium (e.g., a memory) 102, and a display 103. The computer-readable medium 102 stores instructions that, when executed by the one or more processors 101, cause the one or more processors 101 to perform validation of software development requirements in accordance with aspects of the present disclosure. The system 100 interacts with users via a user interface 104 accessible to the users via the display 103.

Figure 2:
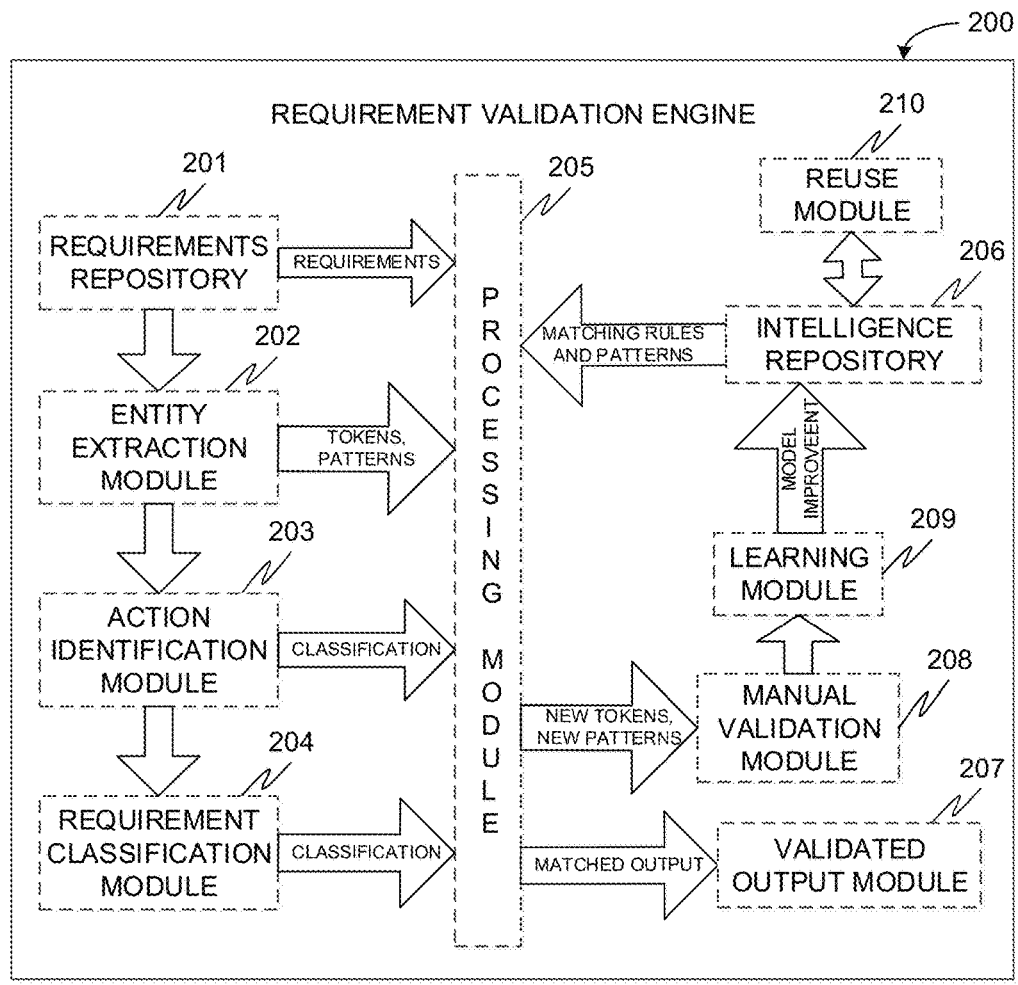
FIG. 2 is a functional block diagram of a software development requirement validation engine in accordance with some embodiments of the present disclosure.

Referring now to FIG. 2, a functional block diagram of a requirement validation engine 200 implemented by the system 100 of FIG. 1 is illustrated in accordance with some embodiments of the present disclosure. The requirement validation engine 200 is configured to access software development requirements, extracting tokens from the requirements, tagging each token to a corresponding part of speech (PoS), derive patterns based on the tokens and corresponding parts of speech, determine a context or a business domain of the requirement, identify pre-defined rules and pre-defined patterns from an intelligence repository based on the context or the business domain, validate the requirement by analyzing the plurality of tokens against the pre-defined rules and by analyzing the pattern against the pre-defined patterns in response to a positive identification, and initiate a learning process based on intelligence gathered from a manual validation of the requirement in response to a negative identification. In some embodiments, the requirement validation engine 200 is also configured to classifying the software development requirements into functional requirements, non-functional requirements, constraint based requirements, action based requirements, and feature based requirements. In some embodiments, the requirement validation engine 200 is further configured to determine omissions in software development requirements based on historical pattern derived from past similar software development requirements. In some embodiments, the requirement validation engine 200 is further configured to generate a report indicating a result of validation.

In some embodiments, the requirement validation engine 200 comprises a requirement repository 201, an entity extraction module 202, an action identification module 203, a requirement classification module 204, a query processing module 205, an intelligence repository 206, a validated output module 207, a manual validation module 208, a learning module 209, and a reuse module 210. A user may interact with the requirement validation engine 200 from the web browser or other interfaces.

The requirement repository 201 is the repository of software development requirements that are to be validated. It receives and stores all the requirements captured during the requirement phase of software development life cycle (SDLC) either via a manual or an automated process. In some embodiment, the user may upload the requirements via the user interface. The entity extraction module 202 is responsible for tokenizing each individual requirement and extracts a plurality of tokens (i.e., keywords) from each of the requirements. The entity extraction module 202 is further responsible for tagging each of the tokens to its corresponding part of speech e.g. noun, verb, adjective, and so forth. Subsequently, the entity extraction module 202 derives a pattern based on the tokens and the corresponding parts of speech. Thus, after the requirement is broken into tokens and corresponding parts of speech (PoS) tags, the entity extraction module 202 subsequently joins the PoS tags to form a logical pattern based on the sequence of the tokens and tags. These patterns form the core dataset for pattern matching in the later stages and are key indicators of violations or erroneous requirements.

The action identification module 203 classifies each of the software development requirements into an action based requirement or a feature based requirements. A feature based requirement describes what should be a part of the software while an action based requirements describes what the software should be able to do. Similarly, the requirement classification module 204 classifies each of the requirements into one of a functional requirement, a non-functional requirement, or a constraint based requirement. In each of the modules 203 and 204, the classification is performed using pre-defined rules and patterns. It should be noted that the parts of speech (PoS) patterns vary for each of the above classification of requirements. Thus, determination of requirement violation using pattern matching in the later stages should take into account above classification.

As will be appreciated by those skilled in the art, the requirement validation engine 200 is adapted to employ unsupervised models for clustering similar requirements for further analysis and entity extraction techniques to identify the actor, the action, and the trigger. Once the requirement data goes through an initial level of screening and preparation at modules 201-204, the processing module 205 validates the requirement by processing and analyzing the data received from the modules 201-204 (i.e., requirements, tokens, patterns, and classification, and so forth). The data is loaded to a graph database where the tokens, patterns, and classification are grouped into a common class, thereby preparing the requirement ready to undergo the process of validation and to finally arrive at a conclusion whether a given requirements adhere to the best practices.

The processing module 205 determines a context or a business domain of the requirement, builds queries based on the tokens and patterns, and identifies pre-defined rules for the tokens and pre-defined patterns for the pattern based on the context or the business domain by executing queries against the intelligence repository 206. In some embodiments, the processing module 205 also takes into account the classification of the requirement while building queries and identifying the pre-defined rules and the pre-defined patterns. Further, in response to a positive identification, the processing module 205 validates the requirement by analyzing the plurality of tokens against the pre-defined rules and by analyzing the pattern against the pre-defined patterns. In some embodiments, the processing module 205 determines violations in the software development requirement and classifies each of the violations into a violation type. As stated above, the violation type comprises at least one of an ambiguous violation, a non-specific violation, a non-atomic violation, an incomplete violation, a duplicate violation, an un-verifiable violation, and a contradiction violation. The processing module 205 presents a result of validation via the validated output module 207. Moreover, in response to a negative identification on encountering new tokens or new patterns, the processing module 205 initiates a learning process based on intelligence gathered from a manual validation of the requirement by activating the manual validation module 208 and the learning module 209. In some embodiments, the processing module 205 also determines omissions in software development requirements based on historical pattern derived from past similar software development requirements by using the reuse module 210.

The intelligence repository 206 stores a series of pre-defined patterns, pre-defined tokens, and pre-defined rules that fulfill the query requests triggered by the processing module 205. It has the following key components: Apriori rules, pattern database, context rules, and business domain rules. The Apriori rules component in the intelligence repository 206 includes a list of tokens and the expected behavior or pattern that it should exhibit. It is built by mining various historical datasets to arrive at the rules. By way of an example, the token "less" is a comparison and should ideally be followed by a number.

The pattern database component includes the part of speech (PoS) tags equivalent of the requirement documented in natural language. It is used to identify the various aspects of the requirement such as the actor, the action, the conditional trigger, the boundaries, and so forth. Such patterns are mined and stored in the repository and matched with the suspect requirement to arrive at a pass or fail condition. It should be noted that a given category of violation exhibit specific PoS pattern which is used to classify the error type.

The context rules component includes rules corresponding to the individual requirement based on its functional area. Examples of context may include, but are not limited to, authentication, graphical user interface (GUI), payment gateway, alert mechanism, and so forth. This component would help in identifying patterns exhibited by various categories or classes of requirements. This in turn, may be employed to subject the requirement to tests specific to its context, thereby increasing the overall accuracy and system performance.

The business domain rules component mines and maintains patterns related to the business domains. The set of tokens and patterns that are extracted for analysis are classified and stored as per the business domains such as healthcare, telecom, retail, and so forth so as to find unique patterns corresponding to it. This would be used to find domain specific violations such as non-adherence to compliance, best practices, and so forth. Similar to context rules component, business domain rules component may be employed to subject the requirement to tests specific to its business domain, thereby increasing the overall accuracy and system performance.

The validated output module 207 presents the result of validation to the user. In some embodiments, the validated output module 207 generates a report indicating the result of validation. The report may include a summary section comprising a number of software development requirements validated, a number of violations, types of violations, a number of each of the types of violations, and other such high-level information. The report may also include a detailed section comprising individual requirements, result of requirement validation on each of the requirements, and a reason for each of the violations in a tabular format. The detailed section may also comprise other such detailed information with respect to validation. The report may be viewed by the user to make corrections to the requirement data.

The manual validation module 208 enables the user to manually validate requirements that could not be validated by the requirement validation engine 200. On every instance when a requirement is analyzed, the processing module 205 checks for emergence of new tokens or new patterns which is not already present in the intelligence repository 206. The manual validation module 208 receives the new tokens or the new patterns along with the corresponding requirements from the processing module 205. The manual validation module 208 then presents such requirements to the user via the user interface for manual validation. In some embodiments, the manual validation module 208 enables the user to define various rules and parameters (e.g., Apriori rules, context rules, business domain rules, patterns, entity relationships, and so forth) governing the new tokens or the new patterns. Alternatively, in some embodiments, the manual validation module 208 may present the user with a probable validation of such requirements. The user may accept or reject the proposed validation. Further, in some embodiments, the manual validation module 208 may present the user with probable rules and parameters governing the new tokens or the new patterns based on manual validation of the requirements. Again, the user may accept or override the proposed rules and parameters. The manual validation module 208 may employ artificial intelligence techniques to suggest probable validation of such requirements, or probable rules and parameters governing the new tokens or the new patterns. Additionally, in some embodiments, the manual validation module enables the users to provide their inputs on wrongly classified requirements which would help in calibrating the requirement validation engine 200 in general and the processing module 205 in particular.

The learning module 209 enables the requirement validation engine 200 to learn new tokens, new patterns, and rules for validation over a period so as to improve. The learning module 209 receives the new tokens or the new patterns along with various rules and parameters governing the new tokens or the new patterns from the manual validation module 208 and learns from them using a supervised learning model. The new tokens, new patterns, and the various rules and parameters governing them are then added to the intelligence repository 206. This aids in growing the intelligence repository 206 and enables the requirement validation engine 200 to learn and improve over time. The learning module 209 also learns from the manual validation of wrongly classified requirements and in some embodiments may adjust corresponding rules and parameters in the intelligence repository 206. The learning module 209 may employ artificial intelligence techniques to process and apply intelligence gathered from the manual validation.

The reuse module 210 enables the requirement validation engine 200 to determine errors of omission in the requirement set based on the patterns, rules and context collected in the intelligence repository 206. The reuse module 210 determines and conveys possible omissions to the user based on evidences from occurrence of requirements in a domain. For example, if the historical data shows that a requirement set containing requirements related to data storage also contains requirements related to data security then in the process of analyzing a new requirement set if such a pattern is not observed then the reuse module 210 alerts the user for a potential case of omission.

As will be appreciated by those skilled in the art, the exemplary requirement validation engine 200 is adapted to use a multi-phased test approach comprising of dictionary based rule, exception matching, and pattern recognition algorithm to analyze the requirements for violation and to and categorize the requirement accordingly. The requirement validation engine 200 examines the requirements in various facets including ambiguity, specificity, atomicity, incompleteness, duplicity, verifiability, and contradiction or consistency. A definition, example, and explanation of each of the listed violation type is provided in following table:

| Violation Type | Example and Explanation | Violation Definition |
| --- | --- | --- |
| Ambiguity | 'The system should start in a minimum time.' The word minimum here is ambiguous as it has no definite interpretation and is subject to user's perception. | Ambiguity is the property of being ambiguous, where a word, term, notation, sign, symbol, phrase, sentence, or any other form used for communication, is called ambiguous if it can be interpreted in more than one way. |
| Specificity | 'The System should be able to alert the user by sending SMS.' Here the requirement is incomplete as it doesn't specify when the alert should be triggered. | Specificity Violations happens when the Requirement doesn't explicitly express when/ where an event should happen. |
| Atomicity | 'The system should record all transactions and populate recommendations for the user.' Here the requirement is non-atomic as it has 2 actions i.e. recording transactions and populating recommendations. | Non-atomicity happens when the Requirement is not independently deliverable, meaning the requirement has more than one component linked to it. |
| Incomplete | 'The System should . . . ' Here the requirement fails to capture the required information and is incomplete | Incompleteness happens when not all entities and actions are captured in the requirement. |
| Duplicity | NA | Duplicity happens when the same requirement is captured more than once. |
| Un-Verifiability | 'The system should support 1 million users on the site without crashing.' This requirement is Un-Verifiable as it is impossible to replicate the same in the test environment. | Un-Verifiability happens when the corresponding test case cannot be generated for a requirement. |
| Contradiction | 'Payment gateway should have 3 levels of authentication, Card number, OTP and Password.' 'Payment gateway should have OTP based authentication.' These 2 requirements are Contradictory as the same requirement specifies different criteria. | Contradiction happens when the expected outcome varies for the same requirement. |

In some embodiments, the validation of software requirements may be performed in a phased manner so as to capture violations. For example, multiple requirements may be validated for duplicity and contradictory in a first phase, and subsequently individual requirement may be validated for incompleteness, atomicity, ambiguity, specificity, and verifiability in a second phase. In addition, the requirement validation engine 200 also checks the lexical semantics of the requirements using pattern matching techniques to determine validity of the requirements. The exemplary requirement validation engine 200 works on the basis of pattern matching derived from a repository of historical requirements to classify violations in the software development requirements. Further, the exemplary requirement validation engine 200 adheres to best practices based on experience and recommendations from internationally acclaimed institutes (e.g., IIBA) and standards.

Few examples of requirement validation performed by the requirement validation engine 200 using patterns, tokens or keywords, and conditions or rules are provided below:

Example 1: "The system shall be able to receive open orders by location."
The tokens and corresponding PoS tags for this requirement are system (Noun—NN), receive (Verb—VB), open orders (Noun—NN), by (preposition—IN), and location (Noun—NN), and the pattern for this requirement is NN VB NN IN NN. The pattern indicates who should do what and when, which is one of the correct patterns or acceptance criteria for an action based requirement. Likewise a large collection of such pattern is extracted, analyzed and stored in the intelligence repository 206 to find violations in requirements.

Additionally, the intelligence repository 206 also includes tokens or keywords and the corresponding conditions or rules (if applicable), it should satisfy to find requirement violations.

Example 2: "The system should process the order ASAP"
The exemplary requirement validation engine 200 evaluates the token 'ASAP' and immediately flags it as an ambiguous requirement based of the knowledge provided to it in the intelligence repository 206.

Example 3: "The system startup time should be as less as possible"
The exemplary requirement validation engine 200 evaluates the token 'less' from the intelligence repository 206 and identifies the conditional match (defined in the repository), i.e. the word less is a comparison and should be followed by a number. As the above condition is not met in the above example requirement, the requirement is flagged as a violation.

It should be noted that the requirement validation engine 200 may be implemented in programmable hardware devices such as programmable gate arrays, programmable array logic, programmable logic devices, and so forth. Alternatively, the requirement validation engine 200 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for validating software development requirements. For example, the exemplary system 100 and the associated requirement validation engine 200 may validate software development requirements by the processes discussed herein. In particular, as will be appreciated by those of ordinary skill in the art, control logic and/or automated routines for performing the techniques and steps described herein may be implemented by the system 100 and the associated requirement validation engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
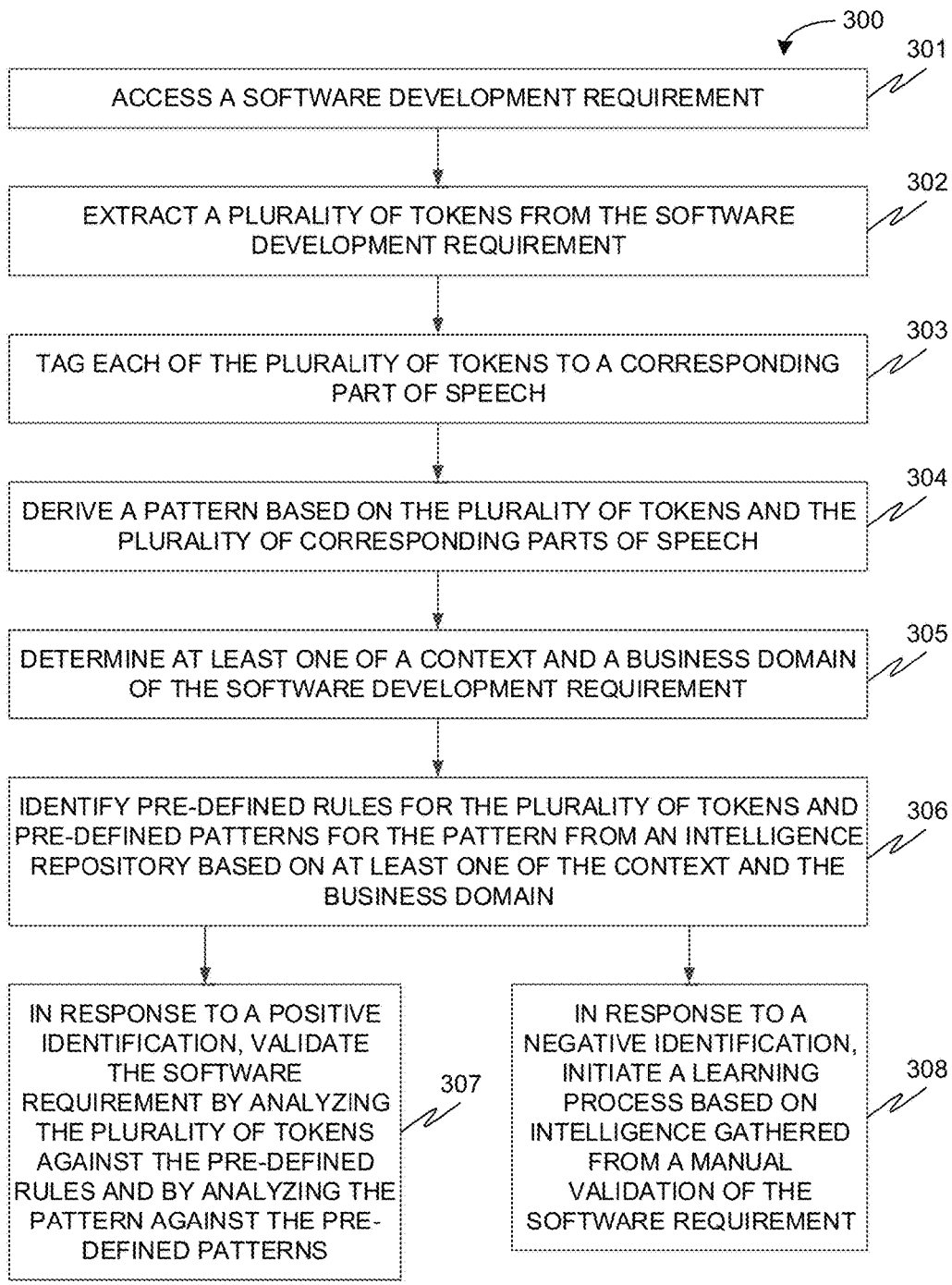
FIG. 3 is a flow diagram of an exemplary process for validating software development requirements in accordance with some embodiments of the present disclosure.

For example, referring now to FIG. 3, exemplary control logic 300 for validating software development requirements via a system, such as system 100, is depicted via a flowchart in accordance with some embodiments of the present disclosure. As illustrated in the flowchart, the control logic 300 includes the steps of accessing a software development requirement at step 301, extracting a plurality of tokens from the software development requirement at step 302, tagging each of the plurality of tokens to a corresponding part of speech at step 303, and deriving a pattern based on the plurality of tokens and the plurality of corresponding parts of speech at step 304. The control logic 300 further includes the steps of determining at least one of a context and a business domain of the software development requirement at step 305, and identifying pre-defined rules for the plurality of tokens and pre-defined patterns for the pattern from an intelligence repository based on at least one of the context and the business domain at step 306. In response to a positive identification, the control logic 300 further includes the step of validating the software development requirement by analyzing the plurality of tokens against the pre-defined rules and by analyzing the pattern against the pre-defined patterns at step 307. Further, in response to a negative identification, the control logic 300 includes the step of initiating a learning process based on intelligence gathered from a manual validation of the software development requirement at step 308.

As noted above, the intelligence repository comprises pre-defined patterns, tokens, pre-defined rules for each of the tokens, and at least one of context rules and business domain rules. In some embodiments, the control logic 300 further includes the step of classifying the software development requirement into at least one of a functional requirement, a non-functional requirement, and a constraint based requirement. In such embodiments, identifying the pre-defined rules and the pre-defined patterns at step 306 is based on the classification of the software development requirement. Additionally, in some embodiments, the control logic 300 includes the step of classifying the software development requirement into at least one of an action based requirement and a feature based requirement. Again, in such embodiments, identifying the pre-defined rules and the pre-defined patterns at step 306 is based on classification of the software development requirement. Moreover, in some embodiments, the control logic 300 further includes the step of generating a report indicating a result of validation. The report may include at least one of a number of software development requirements validated, a number of violations, types of violations, a number of each of the types of violations, and a reason for each of the violations.

In some embodiments, identifying the pre-defined rules and the pre-defined patterns at step 306 comprises building one or more queries based on the plurality of tokens and the pattern, and executing the one or more queries against the intelligence repository. Additionally, in some embodiments, validating at step 307 comprises determining one or more violations in the software development requirement, and classifying each of the one or more violations into a violation type. As noted above, the violation type comprises at least one of an ambiguous violation, a non-specific violation, a non-atomic violation, an incomplete violation, a duplicate violation, an un-verifiable violation, and a contradiction violation. In some embodiments, validating at step 307 further comprises determining one or more omissions in a set of software development requirements based on a historical pattern derived from a set of past similar software development requirements. Moreover, in some embodiments, initiating the learning process at step 308 comprises updating the intelligence repository with the plurality of tokens, the pattern, an outcome of manual validation, and one or more rules.

Figure 4:
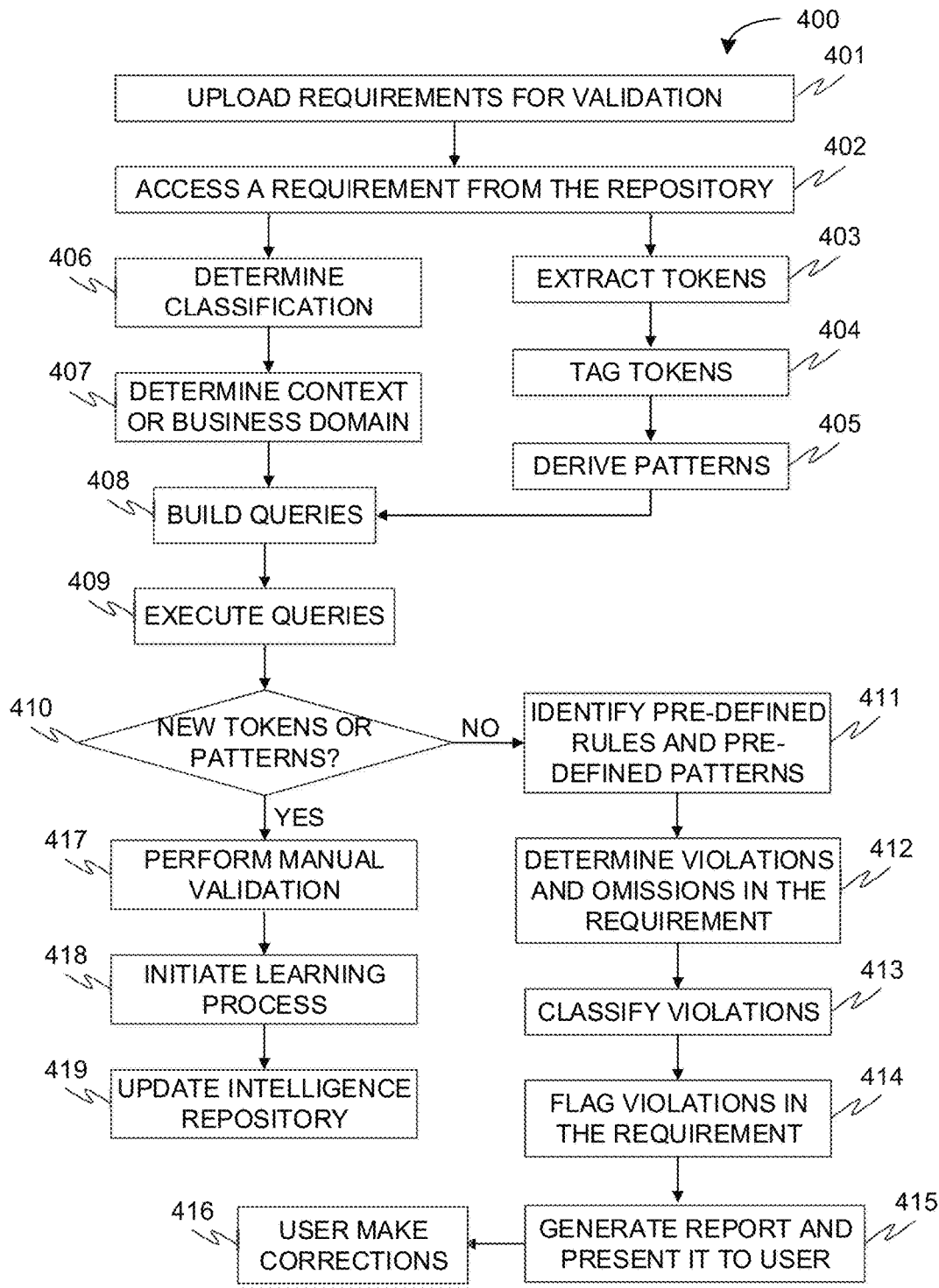
FIG. 4 is a flow diagram of a detailed exemplary process for validating software development requirements in accordance with some embodiments of the present disclosure.

Referring now to FIG. 4, exemplary control logic 400 for validating software development requirements is depicted in greater detail via a flowchart in accordance with some embodiments of the present disclosure. As illustrated in the flowchart, the control logic 400 includes the step of uploading the requirements for validation in a repository at step 401, thereby providing the requirement data for analysis. The user may upload the requirement data using a web interface into the system for analysis. The control logic 400 further includes the step of accessing a requirement from the repository at step 402. The control logic 400 further includes the steps of extracting tokens from the requirement at step 403, tagging each of extracted tokens with a part of speech at step 404, and deriving a pattern based on the tokens and corresponding parts of speech at step 405. These are the initial steps for the starting data analysis. The system picks up individual requirement at step 402 at a time and breaks the requirement into multiple tokens or keywords at step 403. These tokens are tagged to their corresponding parts of speech at step 404 and a pattern is derived at step 405 for subsequent analysis.

Additionally, the control logic 400 includes the step of determining a classification (e.g., functional, non-functional, feature based, action based, and so forth) for the requirement at step 406. The control logic 400 further includes the step of determining a context or a business domain of the classification for the requirement at step 407. The control logic 400 further includes the steps of building queries using the tokens and the pattern based on the classification and the context or the business domain at step 408 and executing the queries against the intelligence repository at step 409. The control logic 400 includes the steps of determining if the tokens and the pattern are new at step 410 based on result of the queries. If the queries returns positive result, i.e., if a match is found for the tokens and the pattern, then the tokens and the pattern are not new. In such scenarios, the control logic 400 proceeds to validate the requirement at steps 411-416. However, if the queries returns negative result, i.e., if a match is not found for the tokens and the pattern, then the tokens and the pattern are new. In such scenarios, the control logic 400 proceeds to initiate the learning process at steps 417-419.

When a positive match is found, the control logic 400 includes the steps of identifying pre-defined rules for the tokens and pre-defined patterns for the pattern at step 411. Thus, the control logic 400 first checks for presence of specific words in the requirements which are predefined in the intelligence repository at step 410 and then checks for conditions associated with the tokens that have positive match. For example, the token 'less' should be followed by a comparison. The control logic 400 also performs a pattern search. As discussed above, the pattern search is performed by comparing the pattern prepared using PoS tags for the individual requirement with the historical patterns observed. The control logic 400 further includes the steps of determining violations and omissions in the requirement based on the pre-defined rules and the pre-defined patterns at step 412, and classifying the violations into one or more of the violation types at step 413. The control logic 400 further includes the step of flagging violations in each of the requirements at step 414. It should be noted that incorrect requirements are either based on wrong use of specific tokens or incorrect patterns. This information is updated with the requirements and the corresponding requirements are flagged as erroneous based on a set of criteria discussed above.

Further, the control logic 400 includes the steps of generating a report on validation and presenting it to the user at step 415, and receiving the corrections made by the user at step 416. Once the requirements are flagged with the violation type, a report is generated indicating a number of violations, types of violations, a number of each of the types of violations, and other such high-level information. The report also contains a detailed view in a tabular format which shows individual requirements and the result of requirement validation on each of the requirements. The report is further presented to the user so as to enable the user to take appropriate actions. After referring to the report, the user makes corrections to the requirement data so as to overcome the violations. In some embodiments, the corrected requirements may pass through another step of validations and the process may continue until all the requirements match the expected quality.

When a match is not found for the new tokens or the new pattern, the control logic 400 includes the steps of performing a manual validation for the requirement at step 417, initiating a learning process based on the intelligence gathered from the manual validation at step 418, and updating the intelligence repository based on the learning at step 419. The manual validation may include identifying one or more violations in the requirement if any and correcting the same. In some embodiments, the user may also define rules and pattern for such requirement for future use. The learning process learns from the user input and associates the requirement, tokens, PoS tags, patterns, rules, and other such information. In some embodiments, the learning process derives the pattern behavior and rules based on the user input. Finally, the intelligence repository is updated with new tokens, new pattern, and the associated rules, conditions, relationship, and patterns for future use.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing this technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing this technology. When implemented on a general-purpose microprocessor, the computer program code segments configure the microprocessor to create specific logic circuits.

Figure 5:
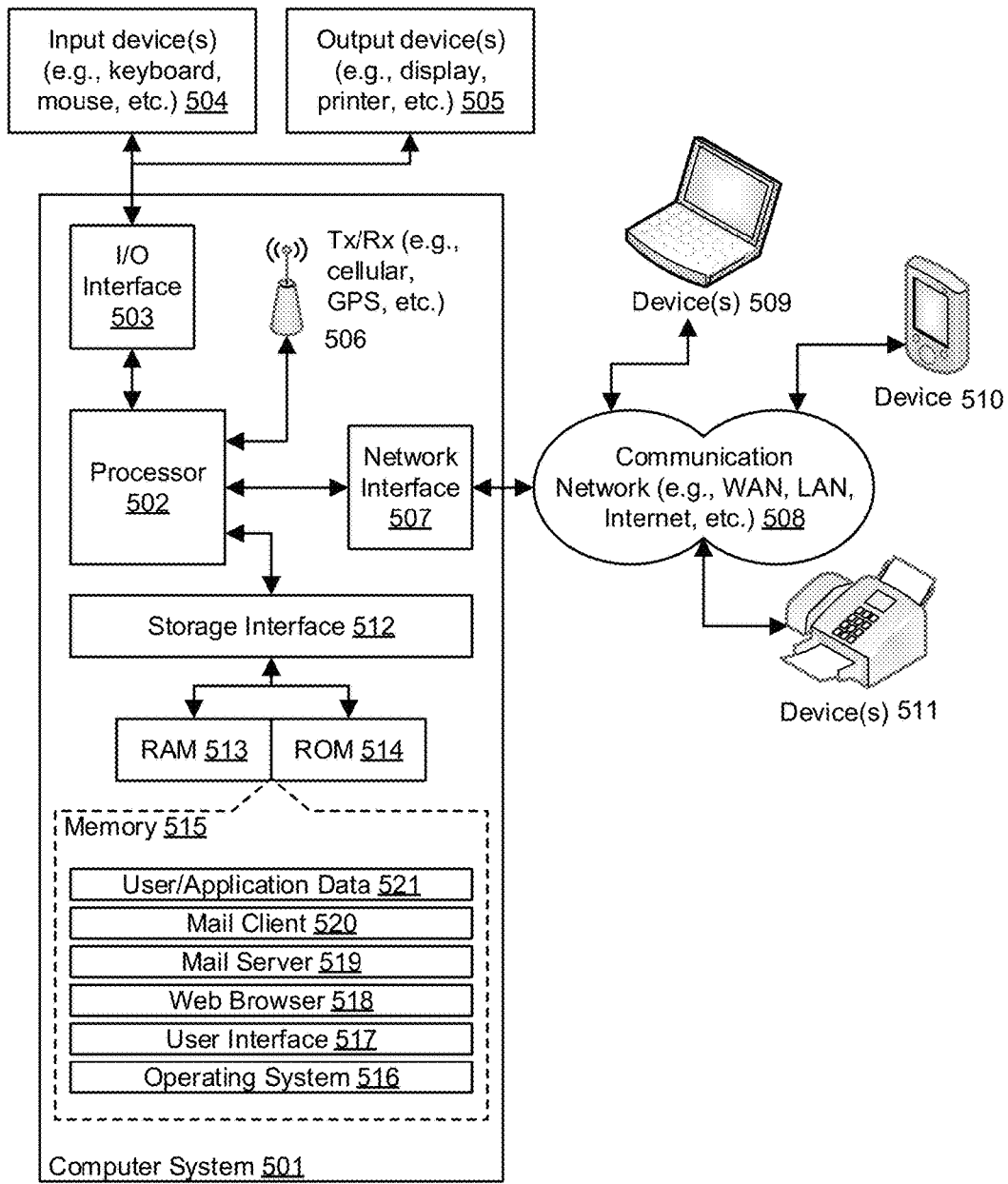
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 and requirement validation engine 200 for validating software development requirements. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 413, ROM 414, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., requirements, tokens, PoS tags, patterns, pre-defined rules and conditions, pre-defined patterns, classifications, violation types, validation reports, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above result in automated and efficient validation of software development requirement at the point of capture, thereby minimizing the adverse effects it could have in the later phases of the SDLC. The techniques perform a 360 degree validation of the software development requirement based on best practices, rule fulfillment, entity relationship, and pattern matching so as to identify violations or defects if any, to classify such violations into corresponding violation types, and to provide reasons for such violations. The techniques involve multi label classification i.e. it also captures violations when the same requirement contains more than one type of violation.

Additionally, the techniques described in the various embodiments discussed above employ pattern matching on top of the rules for increased accuracy and flexibility. Further, the techniques employ context and business domain specific rules and patterns as the requirements structure varies with respect to context and domain, thereby ensuring high degree of accuracy. Further, the techniques categorize the requirement into functional, non-functional, constraint based, action based, and feature based requirements and applies rules and pattern based on such categorization to ensure high degree of accuracy. The categorization also enables the user in understanding the criticality of violation and in prioritizing validation accordingly.

Moreover, the techniques described in the embodiments discussed above employ unsupervised models for clustering similar requirements for analysis and entity extraction techniques to identify the actor, the action and the trigger. The techniques further trigger an alert every time it encounters a new token, action, or relationship pattern which is not a part of its intelligence repository and then employ a feedback learning mechanism so as to learn new patterns and tokens. The self-learning mechanism ensures that the technique keeps improving its efficiency after putting to use, is more reliable and accurate with new sets of data that it analyzes, and has increased intelligence over time.

The specification has described system and method for validating software development requirements. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A method for validating software development requirements, the method comprising:
 accessing, by a validation computing device, a software development requirement;
 extracting, by the validation computing device, a plurality of tokens from the software development requirement;
 tagging, by the validation computing device, each of the plurality of tokens to a corresponding part of speech;
 deriving, by the validation computing device, a pattern based on the plurality of tokens and the plurality of corresponding parts of speech;
 determining, by the validation computing device, at least one of a context or a business domain of the software development requirement;
 identifying, by the validation computing device, pre-defined rules for the plurality of tokens and pre-defined patterns for the pattern from an intelligence repository based on at least one of the context or the business domain;

in response to a positive identification, validating, by the validation computing device, the software development requirement by analyzing the plurality of tokens against the pre-defined rules and by analyzing the pattern against the pre-defined patterns; and in response to a negative identification, initiating, by the validation computing device, a learning process based on intelligence gathered from a manual validation of the software development requirement.

2. The method of claim 1, further comprising classifying, by the validation computing device, at least one of:

the software development requirement into at least one of a functional requirement, a non-functional requirement, or a constraint based requirement, wherein the pre-defined rules and the pre-defined patterns are identified based on the classification; or the software development requirement into at least one of an action based requirement or a feature based requirement, wherein the pre-defined rules and the pre-defined patterns are identified based on the classification.

3. The method of claim 1, wherein the identifying the pre-defined rules and the pre-defined patterns further comprises:

building one or more queries based on the plurality of tokens and the pattern; and executing the one or more queries against the intelligence repository, wherein the intelligence repository comprises pre-defined patterns, tokens, pre-defined rules for each of the tokens, and at least one of context rules or business domain rules.

4. The method of claim 1, wherein the validating further comprises:

determining at least one of one or more omissions in a set of requirements based on a historical pattern derived from a set of past similar requirements or one or more violations in the software development requirement; and classifying each of the one or more violations into a violation type.

5. The method of claim 4, wherein the violation type comprises at least one of an ambiguous violation, a non-specific violation, a non-atomic violation, an incomplete violation, a duplicate violation, an un-verifiable violation, or a contradiction violation.

6. The method of claim 1, wherein the initiating the learning process further comprises updating the intelligence repository with the plurality of tokens, the pattern, an outcome of manual validation, and one or more rules.

7. The method of claim 1, further comprising generating, by the validation computing device, a report indicating a result of validation and including at least one of a number of software development requirements validated, a number of violations, types of violations, a number of each of the types of violations, or a reason for each of the violations.

8. A validation computing device, comprising memory comprising programmed instructions stored in the memory and one or more processors configured to be capable of executing the programmed instructions stored in the memory to:

access a software development requirement;

extract a plurality of tokens from the software development requirement;

tag each of the plurality of tokens to a corresponding part of speech;

derive a pattern based on the plurality of tokens and the plurality of corresponding parts of speech;

determine at least one of a context or a business domain of the software development requirement;

identify pre-defined rules for the plurality of tokens and pre-defined patterns for the pattern from an intelligence repository based on at least one of the context or the business domain;

in response to a positive identification, validate the software development requirement based on an analysis of the plurality of tokens against the pre-defined rules and an analysis of the pattern against the pre-defined patterns; and in response to a negative identification, initiate a learning process based on intelligence gathered from a manual validation of the software development requirement.

9. The validation computing device of claim 8, wherein the one or more processors are further configured to be capable of executing the programmed instructions stored in the memory to classify at least one of:

the software development requirement into at least one of a functional requirement, a non-functional requirement, or a constraint based requirement, wherein the pre-defined rules and the pre-defined patterns are identified based on the classification; or the software development requirement into at least one of an action based requirement or a feature based requirement, wherein the pre-defined rules and the pre-defined patterns are identified based on the classification.

10. The validation computing device of claim 8, wherein the one or more processors are further configured to be capable of executing the programmed instructions stored in the memory to:

build one or more queries based on the plurality of tokens and the pattern; and execute the one or more queries against the intelligence repository, wherein the intelligence repository comprises pre-defined patterns, tokens, pre-defined rules for each of the tokens, and at least one of context rules or business domain rules.

11. The validation computing device of claim 8, wherein the one or more processors are further configured to be capable of executing the programmed instructions stored in the memory to:

determine at least one of one or more omissions in a set of requirements based on a historical pattern derived from a set of past similar requirements or one or more violations in the software development requirement; and classify each of the one or more violations into a violation type.

12. The validation computing device of claim 8, wherein the violation type comprises at least one of an ambiguous violation, a non-specific violation, a non-atomic violation, an incomplete violation, a duplicate violation, an un-verifiable violation, or a contradiction violation.

13. The validation computing device of claim 8, wherein the one or more processors are further configured to be capable of executing the programmed instructions stored in the memory to update the intelligence repository with the plurality of tokens, the pattern, an outcome of manual validation, and one or more rules.

14. The validation computing device of claim 8, wherein the one or more processors are further configured to be capable of executing the programmed instructions stored in the memory to generate a report indicating a result of validation and including at least one of a number of software development requirements validated, a number of violations, types of violations, a number of each of the types of violations, or a reason for each of the violations.

15. A non-transitory computer readable medium having stored thereon instructions for validating software development requirements comprising executable code which when executed by one or more processors, causes the processors to perform steps comprising:
    accessing a software development requirement;
    extracting a plurality of tokens from the software development requirement;
    tagging each of the plurality of tokens to a corresponding part of speech;
    deriving a pattern based on the plurality of tokens and the plurality of corresponding parts of speech;
    determining at least one of a context or a business domain of the software development requirement;
    identifying pre-defined rules for the plurality of tokens and pre-defined patterns for the pattern from an intelligence repository based on at least one of the context or the business domain;
    in response to a positive identification, validating the software development requirement by analyzing the plurality of tokens against the pre-defined rules and by analyzing the pattern against the pre-defined patterns; and
    in response to a negative identification, initiating a learning process based on intelligence gathered from a manual validation of the software development requirement.

16. The non-transitory computer readable medium of claim 15, wherein the executable code when executed by the processors causes the processor to perform one or more additional steps comprising classify at least one of:
    the software development requirement into at least one of a functional requirement, a non-functional requirement, or a constraint based requirement, wherein the pre-defined rules and the pre-defined patterns are identified based on the classification; or
    the software development requirement into at least one of an action based requirement or a feature based requirement, wherein the pre-defined rules and the pre-defined patterns are identified based on the classification.

17. The non-transitory computer readable medium of claim 15, wherein the identifying the pre-defined rules and the pre-defined patterns further comprises:
    building one or more queries based on the plurality of tokens and the pattern; and
    executing the one or more queries against the intelligence repository, wherein the intelligence repository comprises pre-defined patterns, tokens, pre-defined rules for each of the tokens, and at least one of context rules or business domain rules.

18. The non-transitory computer readable medium of claim 15, wherein the validating further comprises:
    determining at least one of one or more omissions in a set of requirements based on a historical pattern derived from a set of past similar requirements or one or more violations in the software development requirement; and
    classifying each of the one or more violations into a violation type.

19. The non-transitory computer readable medium of claim 15, wherein the violation type comprises at least one of an ambiguous violation, a non-specific violation, a non-atomic violation, an incomplete violation, a duplicate violation, an un-verifiable violation, or a contradiction violation.

20. The non-transitory computer readable medium of claim 15, the initiating the learning process further comprises updating the intelligence repository with the plurality of tokens, the pattern, an outcome of manual validation, and one or more rules.

21. The non-transitory computer readable medium of claim 15, wherein the executable code when executed by the processors causes the processor to perform one or more additional steps comprising classify at least one of generating a report indicating a result of validation and including at least one of a number of software development requirements validated, a number of violations, types of violations, a number of each of the types of violations, or a reason for each of the violations.

* * * * *